United States Patent [19]

Feikema et al.

[11] 4,432,561
[45] Feb. 21, 1984

[54] TRICYCLE RECUMBENT

[76] Inventors: Roger H. Feikema; Harry J. Bakker, both of 6050 Palmer Blvd., Sarasota, Fla. 33582

[21] Appl. No.: 374,694

[22] Filed: May 4, 1982

[51] Int. Cl.³ .......................... B62K 5/04; B62K 17/00
[52] U.S. Cl. .............................. 280/281 LP; 280/111; 280/263; 280/266; 280/267; 280/282
[58] Field of Search ............ 280/281 LP, 281 W, 282, 280/263, 266, 267, 97, 109, 111

[56] References Cited

U.S. PATENT DOCUMENTS

| 3,981,516 | 9/1976 | Häggkvist | 280/282 |
| 3,995,875 | 12/1976 | Wada | 280/282 |
| 4,198,072 | 4/1980 | Hopkins | 280/281 LP |
| 4,283,070 | 8/1981 | Forresstall et al. | 280/281 LP |
| 4,359,231 | 11/1982 | Mulcahy | 280/281 LP |

Primary Examiner—Joseph F. Peters, Jr.
Assistant Examiner—Donn McGiehan
Attorney, Agent, or Firm—Frijouf, Rust & Pyle

[57] ABSTRACT

An amusement tricycle wherein the operator is transported in an inclining position on a hammock cradle. the cradle is carried by a front wheel which does not pivot relative to the cradle. The cradle and wheel rotate about a downwardly sloping axis to turn. The cradle is supported to the rear by a two wheel buggy. The cradle is mounted on the buggy by a pivot. The pivot rotates about the axis. The buggy in turn, is stabilized by pivotal attachment to the cradle.

7 Claims, 7 Drawing Figures

TRICYCLE RECUMBENT

BACKGROUND OF THE INVENTION

1. Field of the Invention

This invention relates, in general, to pedal-powered cycles, generally embracing bicycles and tricycles, and more specifically is directed to an amusement or recreational three-wheeled cycle intended principally for novelty and amusement, and to a modification used for high speed aerodynamic design.

2. Description of the Prior Art

The lowly wheelbarrow may be, to some extent, considered prior art in that there is a forward single wheel, a cradle rearwardly thereof supported by a subframe, and some means, which is the operator, that supports the rearward elevated portion of the frame above the axle of the forward wheel. Turning is accomplished by tilting of the front wheel in the direction of desired travel. In this case, the burden cradle also tilts.

A distant cousin of the invention would by the tricycle, commonly referred to as a "trike" which is essentially a bicycle with a fixed set of rear wheels rather than a single wheel. Steering is done strictly by turing the front wheel in the direction which travel is to follow. There is no tilting of the burden cradle as there is in the wheelbarrow situation.

A child's version of the tricycle is also available, made principally of molded plastic parts, wherein the front wheel is driven by pedal-pads mounted on crank arms fastened directly to the axle of the front wheel. The cradle and rear wheels are fixed, and turning is accomplished strictly as in the adult trike. Then turning angle is limited to the extent that a child can spread his legs to allow the wheel to turn. This limitation is created by the fact that drive is by the placement of the driving pedal on the axle of the front wheel, whereas in the adult trike the drive is chain transmitted to the rear wheels as in normal bicycle construction.

Finally, the only other known prior art which is of consequence, is the effort to produce a high speed powered vehicle wherein the most successful effort has been a reclining cradle for the operator and pedals which are drive connected to a single rear wheel through a drive train. There are two front wheels with automotive type steering. The pedals are located such that the operator can drive the pedals by muscular power instead of being limited to the force which can be applied by the body weight of the operator.

Such devices are generally of very lightweight construction and housed in an aerodynamically engineered capsule in order to reduce wind drag. There is no known prior device of this type wherein the front wheel is in fixed relationship to the cradle and guidance caused by tilting as in the present invention.

SUMMARY OF THE INVENTION

This invention is in the nature of a three-wheeled tricycle, wherein a main frame and forward wheel are a unit which is caused to rotate about a downwardly sloping axis, which axis intersects the ground in the vicinity of the front wheel. The tilt of the main frame produces a forward and a vertical component. The vertical component produces the guiding action of the front wheel. A secondary wheeled frame supports the remote end of the main frame.

This construction eliminates the need for steering parts, thereby reducing original cost, and service cost. Further, the body weight of the rider is caused to bank into the turn for better rider comfort and stability. Also, an object of the invention is to provide a front wheel drive tricycle with a minimum of drive components.

Another object of the invention is to provide a front wheel drive tricycle wherein the operator is in an inclined position for better use of leg muscles and improved aerodynamics.

A still further object of the invention is to provide a three wheel tricycle wherein the passenger cradle and front wheel are a fixed unit and the tricycle is guided by tilting of the passenger supporting cradle and front wheel, as opposed to a steering head as used in two wheel bicycles for turning the wheel relative to the frame.

It is yet another object of the invention to provide a three wheel vehicle wherein the front wheel and the body cradle are supported pivotally upon a secondary wheeled frame, the wheeled frame being stabilized by a pivotal mount located at a point between the back wheels of the secondary frame and the forward single wheel. The pivotal mount includes a joint which allows the main frame and the operator support cradle to roll relative to the secondary support frame.

The foregoing has outlined rather broadly the more pertinent and important features of the present invention in order that the detailed description of the invention that follows may be better understood so that the present contribution to the art can be more fully appreciated. Additionally, features of the invention will be described hereinafter which form the subject of the claims of the invention. It should be appreciated by those skilled in the art that the conception and specific embodiment disclosed may be readily utilized as a basis for modifying or designing other devices for carrying out the same purposes as the present invention. It should be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be had to the following detailed description taken in conjunction with the accompanying drawings in which.

Similar reference characters refer to similar parts throughout the several views of the drawings.

DETAILED DESCRIPTION

The preferred embodiment of the pedal-powered wheeled vehicle of this invention is composed generally of a passenger cradle carried by a fixed wheel at the front of the cradle and supported at the remote end by some means, which, in the preferred embodiment, is a wheeled support frame. The two units are coordinated to allow the passenger cradle to tilt along its axis and thereby pivot the forward wheel for guiding the vehicle. The roll of the cradle and tilt of the front wheel take place without materially turning the rear wheels, thereby neither reducing or accentuating the turning movement.

The structure of the preferred illustrated embodiment is built upon a front wheel 10 and two rear wheels 12 and 13. The wheels are arranged with the two wheels positioned on a first and a second side of the cradle respectively. The single wheel is positioned forward of the cradle at the apex of a triangular relationship with the two wheels of the support frame.

Figure 2:
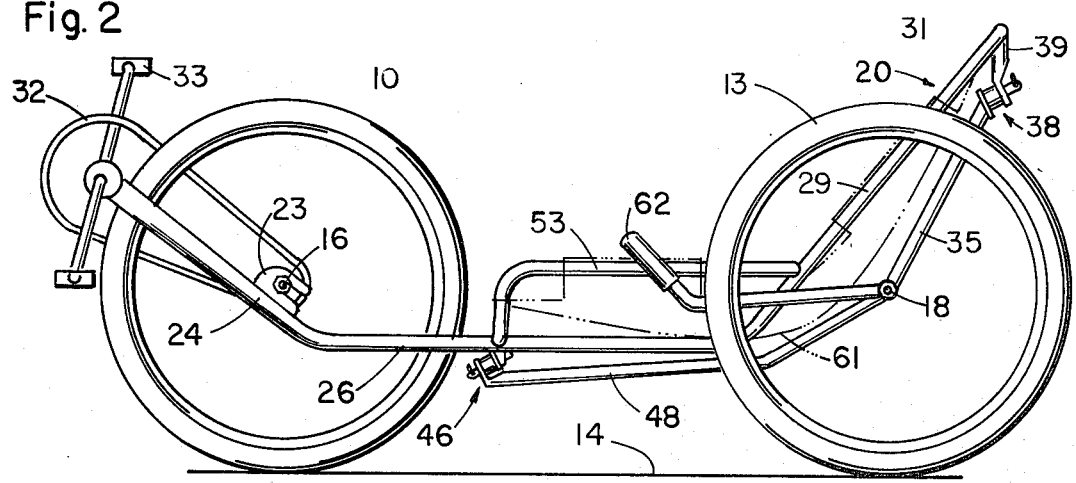
FIG. 2 is a side elevation of the vehicle.
Figure 3:
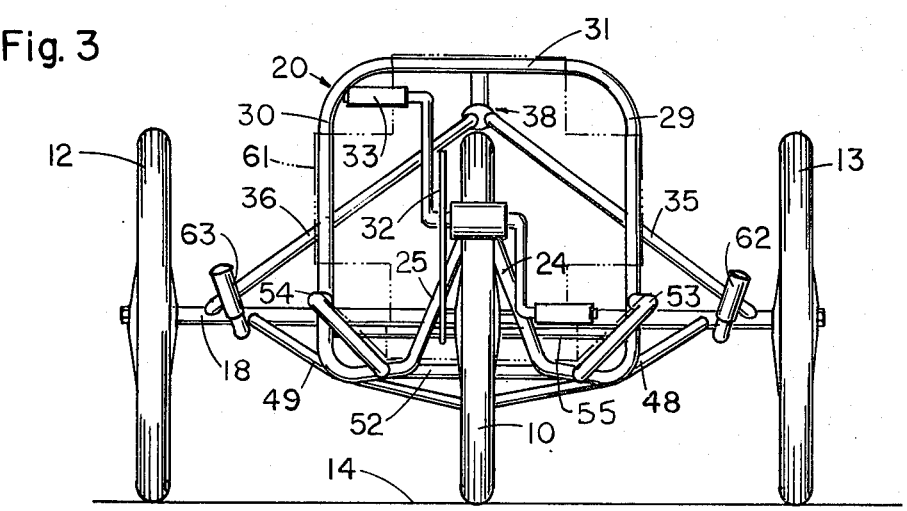
FIG. 3 is a front view of the vehicle.
Figure 4:
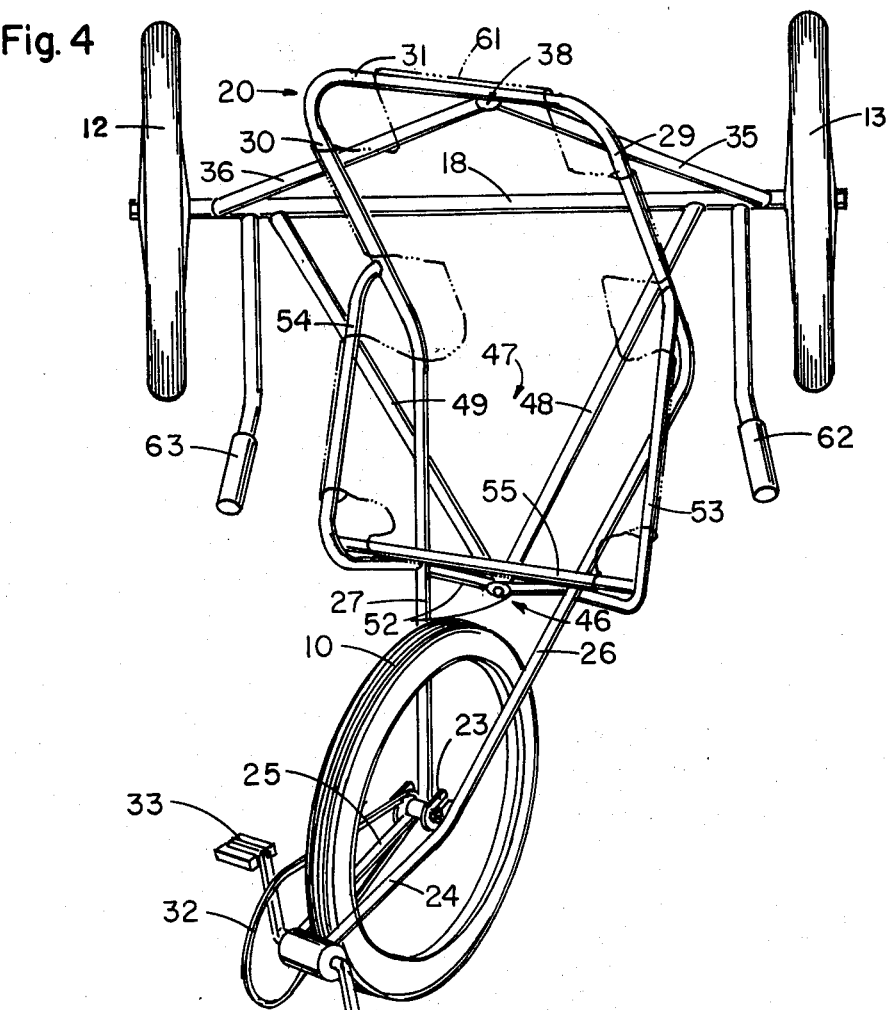
FIG. 4 is a top view of the vehicle with the passenger cradle tipped to make a turn of the vehicle.
Figure 5:
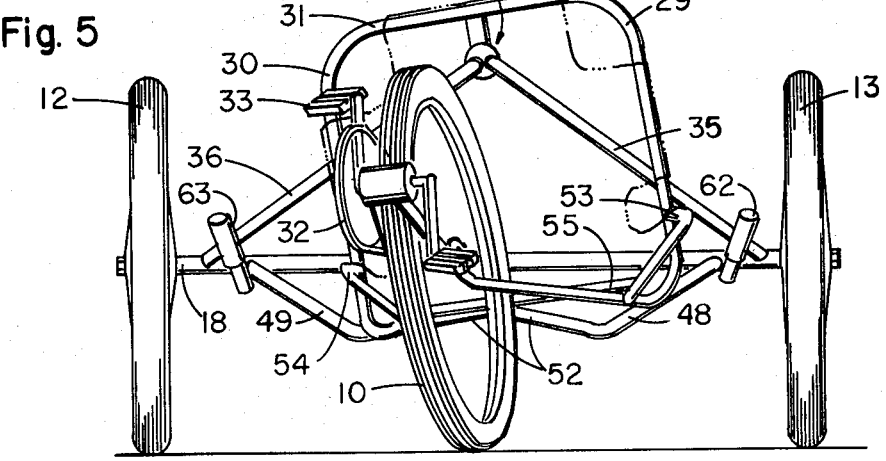
FIG. 5 is a front view of the vehicle with the passenger cradle tipped to make a turn of the vehicle.

For better structural analysis, FIG. 2 has included a diagramatic line 14 to represent a support or common plane upon which the three wheels sit, referring, therefore, to the surface upon which the vehicle runs.

The front wheel 10 has an axle 16 and the two rear wheels 12 and 13 are supported on a common axle 18.

The main frame is formed into a passenger cradle. The main frame cradle is indicated generally by the reference character 20 in FIG. 1.

Figure 1:
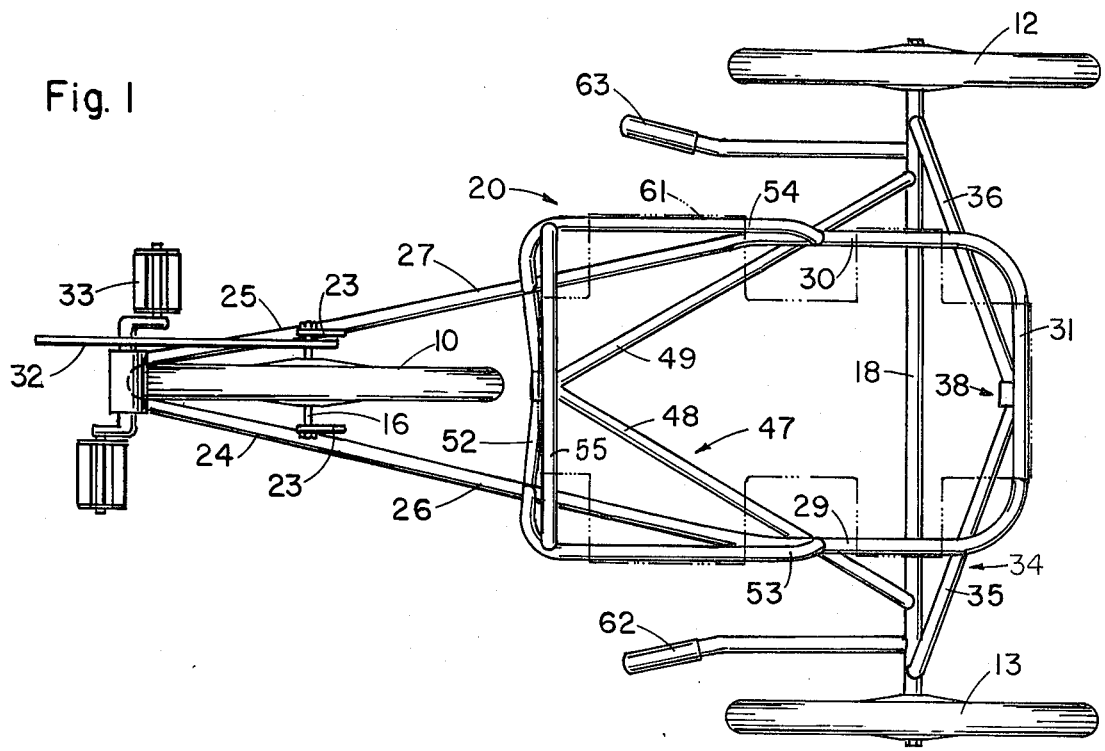
FIG. 1 is a top view of the vehicle.

The main frame, which forms the cradle 20, is composed of a lateral extension 24, seen best in FIG. 1, and a lateral extension 25. Extensions 24 and 25 span the forward wheel and hand by brackets 23 upon the axle 16.

The extensions 24 and 25 are not literally separate members, but are part and parcel of a horizontal run 26 and a horizontal run 27, respectively, which extend rearwardly in a substantially horizontal plane to the area between the two rear wheels and then upwardly in runs 29 and 30 at an obtuse angle, between 26 and 29, above the axle 18. The upward runs 29 and 30 are then joined by the cross frame 31.

The drawings reveal that the extensions, the horizontal runs, the upward runs, together with the cross frame 31 are in fact a single unitary piece in this preferred embodiment, and form the foundation for the passenger cradle 20.

The cradle 20 is substantially a recliner chair configuration with the horizontal runs 26 and 27 forming a seat portion and the upwardly extending runs 29 and 30 forming the back support portion. Therefore, when the cradle is closed in by webbing, usually of the type found in modern outdoor furniture, a passenger can be seated in a reclining position with legs extending forward straddling the wheel 10. A substantially conventional sprocket drive 32, located forward of wheel 10, is driven by pedals 33 to drive the front wheel in a conventional chain-delivered drive to the front wheel.

To support the cradle 20, a brace 34, composed of triangular arranged tubes 35 and 36, extend from axle 18 to a pivot 38.

Figure 6:
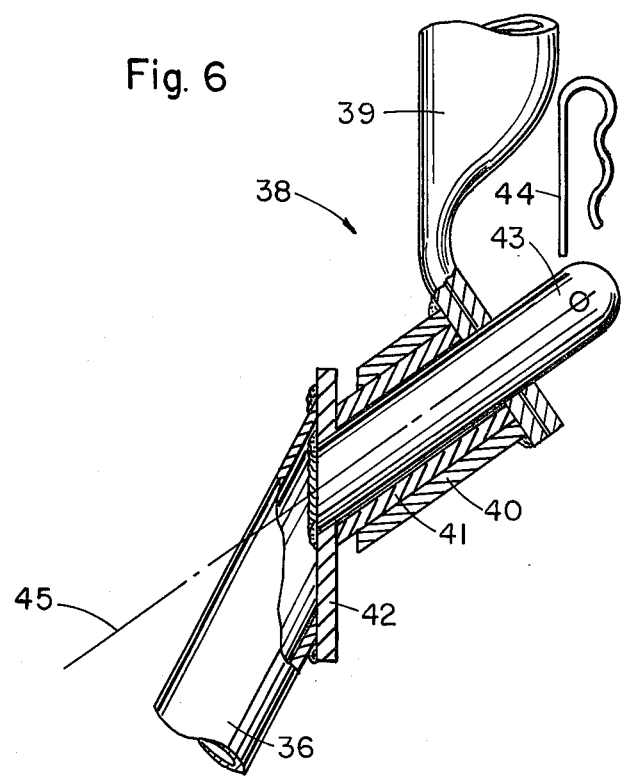
FIG. 6 is a section view of the cradle support bearing.

The pivot 38 is shown in detail in FIG. 6.

The pivot 38 supported by a hanger bracket 39 carried by the cross frame 31 substantially at the mid point of the cross frame 31 which is aligned with a plane on which the wheel 10 lies.

The pivot 38 may be a conventional flat pivot, but the preferred embodiment is a self aligning pivot structure, best seen in FIG. 6.

A housing 40 is welded to the flattened tip of the hanger bracket 39 and houses a bearing 41. The bearing 41 has a face which is inclined to the plane of rotation.

A face plate 42 is used to join the tubes 35 and 36, and present a bearing surface against which the bearing 41 may rest. The pivot is completed by a pin 43 secured to a plate 42 and passing through the center of bearing 41. The supporting load of the cradle 20 is vertically downwardly through the hanger brackets 39, thus pressing the bearing 41 against the plate 42, which plate is supported by the brace 34 through the tubes 35 and 36.

The face of the bearing 41 is not square, and thus, is a cam bearing so that whenever the cradle 20 is rolled about pin 43, it will tend to cam upwardly. See FIG. 6. When the passenger releases the rolling force, the pivot will return the cradle to a level attitude by cam action. This is a known principle in door closure, but a novel application in racing tricycles.

A hitch pin 44 is employed to prevent separation of the pin 43 from the bearing 41 in the event the vehicle is lifted by the cradle to reverse the forces.

The pivot 38 is unique in this structure in that it is desired that the cradle be able to roll about its axis 45, which axis 45 extends along the axis of the pin 43 and reaches the common support plane 14 at a point in a range substantially within the projected diameter of the wheel 10 onto the plane 14. The preferred range is that length of the line 14 between two normal lines to plane 14 which are tangent to the opposite sides of wheel 10.

There is no set limit to the angle of axis 45 with respect to the intersection point with plane 14, but experience has shown that if the angle is kept such that the axis reaches the support plane within the projected diameter of the front wheel, the vehicle will be stable enough to be safe against tipping, but will have a flexibility of guidance which will enable quick turns for lively steering action.

Figure 7:
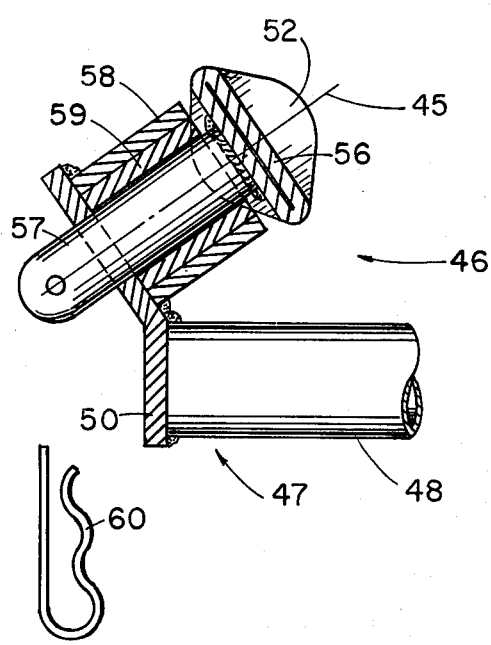
FIG. 7 is a section view of the support frame stabilizing pivot.

This axis is indicated by the reference character 45 drawn between the FIGS. 6 and 7 to illustrate the alignment of pivot 38, on which the cradle 20 hangs, and a second pivot 46 which stabilizes a support frame 47.

The second pivot 46, shown in FIG. 7, provides a stability tying point for the support frame 47. The frame 47, in this preferred embodiment, is composed of tie rods 48 and 49 which are secured to the axle 18 near the respective wheels 12 and 13, and extend in triangular relationship to the pivot 46.

A face plate 50, shown in FIG. 7 serves as a common junction for rods 48 and 49. These rods are shown welded to the plate in FIG. 7.

The passenger cradle and the support for the pivot 46 are jointly accomplished by a tubular member divided into functional portions comprising a cross frame 52 upon which the pivot 46 is actually mounted and two side frame members 53 and 54. The member 53 is connected to run 26 adjacent wheel 10, and to run 29 between wheels 12 and 13. Member 54 is connected to run 27 adjacent wheel 10 and to run 30 between wheels 12 and 13. The members 53 and 54 provide side arms of a frame to which the seat webbing 61 of the cradle is fastened. A forward cross bar 55 anchors the seat webbing in order to produce a bucket seat configuration for the support of the operator.

A flattened central area of the cross frame 52, seen best in FIG. 7, is equipped with a centering guide pin 57. A female bearing receptor 58 is welded to the face plate 50 and a cylindrical bearing 59 is carried in the receptor and around the pin 57. A hitch pin 60 is employed to prevent accidental separation of the pin 57 from the bearing.

Note that there is no bearing contact shown between the flattened portion 56 and the bearing 59. Normally, the cradle does not rest upon the bearing 59, but rather the tie rods 48 and 49 are held by the pivot 46 in a stable forward position. The support, nevertheless, must be pivotal, because the cradle rotates around the axis 45, and therefore the pivot 46 must permit that rotation.

Also, because of the rotation of the cradle, the pivot 46 must also lie upon the axis 45. Therefore, as the cradle is permitted to turn one way or the other in guiding the vehicle, there is no binding or resistance by reason of improper support of the frame 47.

Webbing 61 is shown as a suggested torso support for the passenger, and is shown only in partial view in order to obscure the structural portions of the vehicle.

A further geometric description will give a better understanding of the relationship of the pivotally connected parts. The first and second pivot joints are rotatable about a common axis which lies on the hypotenus of a triangle. The triangle is defined by the common support plane 14, the hypotenus of which is the axis 45, and a line normal to the support plane 14 passing through the axis of the two wheels. The hypotenus axis 45 intersects the support plane 14 of the wheels at a point within the range of the radius of the forward single wheel projected on either side of a line from the single wheel axis normal to the plane 14. This definition is given only to emphasize that the preferred angle of the axis 45, for ease in handling and stability, is to be exactly at the intersection of a normal to the plane 14 intersecting the axle 16, but may vary forwardly and rearwardly a reasonable distance, which reasonable distance is substantially equal to the diameter of the wheel 10.

To complete the structure for ease of handling, handle bars 62 and 63 carried by the axle 18, simply enable the operator to apply torsion movement to his body for rolling the cradle and guiding the vehicle.

What is claimed is:

1. A pedal-powered wheeled vehicle, comprising:
    a single front wheel and two rear wheels in triangular relationship, the rear wheels mounted on a common axle;
    a passenger cradle having a torso-holding frame;
    means for support of the frame on the front wheel in an angled attitude extending upwardly and to the rear of the front wheel;
    a first pivot and frame means for pivotally supporting the cradle on the rear wheels at a position rearward and upward from said front wheel;
    the first pivot, the front wheel, and the torso-holding frame aligned to enable the cradle to swing about an axis intersecting the ground area projection of the front wheel diameter;
    rear wheel stabilizing means including a second pivot carried by the torso-holding frame and tie rod means for rigidly securing the rear wheel axle to the second pivot, the second pivot being aligned to turn about the axis of the first pivot;
    whereby the vehicle is caused to steer by rolling of the cradle to tilt the front wheel, but the rear wheels experience essentially no guiding turning.

2. In a pedal-powered wheeled vehicle as defined in claim 1, the first pivot, the front wheel and the torso holding frame aligned to enable the cradle to swing about an axis passing through a point substantially at the intersection of a plane tangent to all three wheels and a radial line of the front wheel normal to the plane.

3. In a pedal-powered wheeled vehicle as defined in claim 1, the tie rod means being a first and second rod, the first rod secured to the rear wheel axle near a first wheel and the second rod secured to said axle near a second wheel, the rods extending toward the front wheel and merging at said second pivot.

4. A pedal-powered wheeled vehicle comprising:
    three wheels aligned to a common plane in triangular relationship tangent with a forward wheel and two rear wheels;
    a main frame formed into a passenger cradle having forward extensions spanning the forward wheel with means for supporting the extensions on the axle of the forward wheel, the frame extending rearwardly in a substantially horizontal plane to the area between the remaining two wheels, and then upwardly at an obtuse angle above the axle of the two wheels;
    a secondary frame having an axle joining the two rear wheels, a brace from the axle to the top of the main frame, and a first pivot joining the main frame to the brace;
    tie rod means extending from the axle to a point forward of the axle and adjacent the forward wheel, a second pivot joining the tie rod means to the main frame substantially along the longitudinal axis of the frame;
    said first and second pivots aligned to allow swing support of the main frame relative to the secondary frame about a common axis of the pivots, the axis passing through said common plane at a point in a range substantially equal to the diameter of the forward wheel projected equally about a normal line from the axis of the forward wheel to said plane.

5. In a pedal-powered wheeled vehicle as defined in claim 4, said brace being a first and second rod, the first rod secured to the rear wheel axle near a first wheel and the second rod secured to the said axle near a second wheel, the rods extending upward and merging at said first pivot.

6. In a pedal-powered wheeled vehicle as defined in claims 1 or 4, the said first pivot having a cam interface such that swing of the passenger cradle away from its lowest gravitational swing position will cause the cradle to climb the pivot cam face and produce a component of force urging the cradle to return to its lowest swing position.

7. A pedal-powered three wheeled vehicle, having a passenger cradle and a support frame, with pivotal interconnection of the cradle and frame, characterized by:
    two wheels for the support frame positioned on a first and second side of the cradle respectively;
    a single wheel positioned forward of the cradle at the apex of a triangular relationship with the two wheels of the support frame;
    said cradle supported on the single wheel;
    the three wheels aligned to establish a common support plane tangent to the wheels;
    a first pivot joint supporting the rear of the cradle on the frame at a point above and between the two wheels;
    a second pivot joint joining the forward portion of the cradle and support frame at a point forward of the rear wheels;
    said first and second pivot joints are rotatable about a common axis which lies on the hypotenus of a triangle, which triangle is defined by a first line segment from the first pivot joint extending normally to the common support plane and a second line segment from the intersection of that normal first line segment extending forward in the common support plane and terminating within the projection of the diameter of the forward wheel onto the common support plane, whereby said hypotenus intersects the support plane of the wheels at a point within the range of the diameter of the forward single wheel projected onto the support plane.

* * * * *